Patented Feb. 10, 1931

1,791,658

UNITED STATES PATENT OFFICE

DURAIN C. BUTTS, OF DOVER, NEW JERSEY, ASSIGNOR TO HERCULES POWDER COMPANY, OF WILMINGTON, DELAWARE, A CORPORATION OF DELAWARE

METHOD OF TREATING ROSIN

No Drawing.  Application filed October 16, 1926.  Serial No. 142,158.

My invention relates to a method for treating rosin, more especially for treating wood rosin, such as is obtained by the extraction of light wood, to the end that its color may be improved, that its specific rotation may be increased and that its tendency toward crystallization may be decreased.

Rosin, and especially wood rosin, as heretofore produced for the making of rosin soaps, has been found to be open to the serious objection that it contains color bodies which on aging of the soaps tend to darken and effect discoloration of the soaps. Further, wood rosin as heretofore produced has a pronounced tendency to crystallize, rendering it disadvantageous for use, for example, in the manufacture of paper size, since the crystals formed are dissolved very slowly in caustic soda and float on the surface of the melt. The tendency of wood rosin to crystallize likewise makes it disadvantageous for use in the making of sealing wax and the like, since it shows its crystallizing tendency in the finished product. The tendency of wood rosin to crystallize renders its use disadvantageous in connection with numerous other possible uses as, for example, in the production of core oils, etc.

As is well known, when a rosin is obtained which has a comparatively high dextro-rotary power, its tendency to crystallize with age is comparatively slight, whereas a rosin having a low dextro-rotary power or a laevo-rotary power has a very pronounced tendency toward crystallization.

It is also known that if a rosin having a laevo or low dextro-rotary power be raised to a higher dextro-rotary power the tendency to crystallize will be minimized and that such can be accomplished by heating.

However, in previous attempts to raise the dextro-rotation of rosins by the use of heat, the treatment has resulted in the imparting of dark color to the rosin, and lowering its melting point and acid number, which renders it less valuable for many purposes, and overbalances, from the economic standpoint, the decrease in its tendency to crystallize.

In accordance with my invention I provide a method of treating rosin by which its specific rotation may be substantially raised, its tendency to crystallize substantially decreased and, at the same time, its color perceptibly improved, the improved color being reflected markedly in the soaps produced with the rosin by a very substantial decrease in the tendency of the soaps produced therefrom to darken on aging.

In carrying out the method in accordance with my invention, I heat the rosin in the presence of an inert gas, for a period of time, at a temperature sufficiently high to produce the desired results, while avoiding distillation of the rosin.

As a typical example of the practical carrying out of my process, the rosin is heated to a temperature of about 325° C. in any suitable vessel, by the application of heat in any convenient manner, for a period of about one-half hour, during which period a stream of carbon dioxide gas is steadily passed through the vessel.

In giving a typical example of the carrying out of my process, it will be understood that the temperature to which the rosin is heated and the time during which it is heated may be varied within substantial limits, for example, the rosin may be heated to temperatures between about 280° C.–350° C. for periods ranging from about one hour, at the lower temperature, to about one-half hour, at the higher temperature, it being primarily necessary that the oxygen be excluded from the presence of the rosin during treatment and that the rosin be treated in the presence of an inert gas as, for example, carbon dioxide or nitrogen.

As a result of the treatment in accordance with my process, if, for example, the rosin treated has a specific rotation before treatment of say 5.2°, it will be found after treatment that the rotation has been raised to say 38.6° and that the tendency of the rosin to crystallize has been greatly decreased, if not eliminated.

It will further be found that the color of the rosin has been perceptibly improved and that soaps produced therefrom will be of perceptibly improved color and will have a substantially increased tendency to retain their color on aging.

The process in accordance with my invention, so far as the improvement in the color of the rosin and of soaps produced therefrom is concerned, is of particular value in the treatment of wood rosin, while the treatment, so far as it results in the production of a rosin having a decreased tendency toward crystallization is concerned, may be beneficially used for the treatment of gum rosin as well as wood rosin.

Having now fully described my invention, what I claim and desire to protect by Letters Patent is:—

1. The method of treating rosin which includes subjecting the rosin, in the presence of chemically inert atmosphere, to a temperature not substantially below 280° C. and not substantially above 350° C. while avoiding substantial distillation and decomposition of the rosin.

2. The method of treating rosin which includes subjecting the rosin, in the presence of chemically inert atmosphere, to a temperature of about 325° C. while avoiding substantial distillation and decomposition of the rosin.

3. The method of treating rosin which includes subjecting the rosin, in the presence of chemically inert atmosphere, to a temperature not substantially below 280° C. and not substantially above 350° C. for a period of not less than about one-half hour.

4. The method of treating rosin which includes subjecting the rosin, in the presence of an atmosphere of carbon dioxide, to a temperature from about 280° C. to about 350° C. for not less than about one-half hour.

5. The method of treating rosin which includes subjecting the rosin, in the presence of an atmosphere of carbon dioxide, to a temperature of about 325° C. for a period of about one-half hour.

6. The method of treating wood rosin which includes subjecting wood rosin in the presence of a non-oxidizing atmosphere to a temperature not substantially below 280° C. and not substantially above 350° C. for not less than about one-half hour while avoiding substantial distillation and decomposition of the rosin.

In testimony of which invention, I have hereunto set my hand, at Kenvil, N. J., on this 1st day of October, 1926.

DURAIN C. BUTTS.